Figure 10:
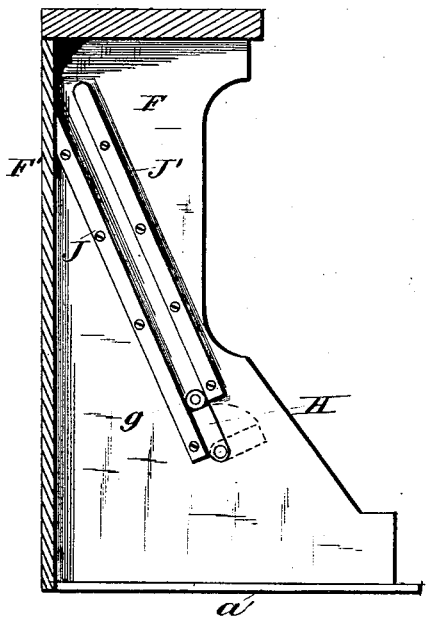

(No Model.)  3 Sheets—Sheet 1.
J. W. STANTON & J. SHIBLEY.
ATTACHMENT FOR FOLDING AND MOVABLE FURNITURE.
No. 261,059. Patented July 11, 1882.
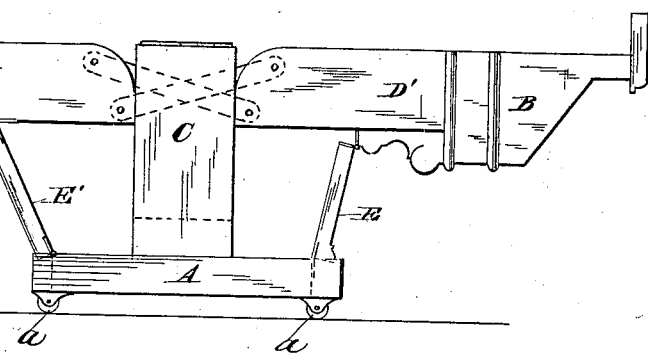
Fig. 1.
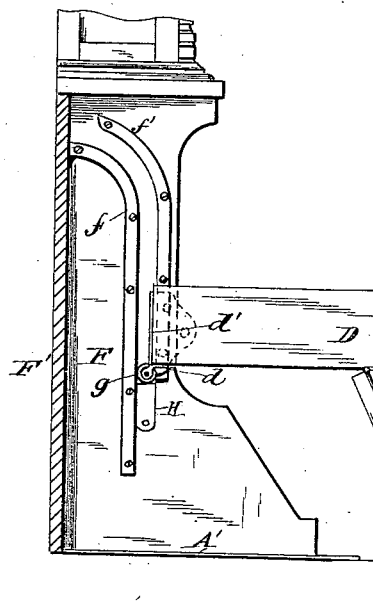
Fig. 2.
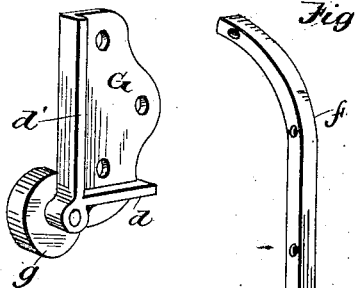
Fig. 3.
Fig. 4.
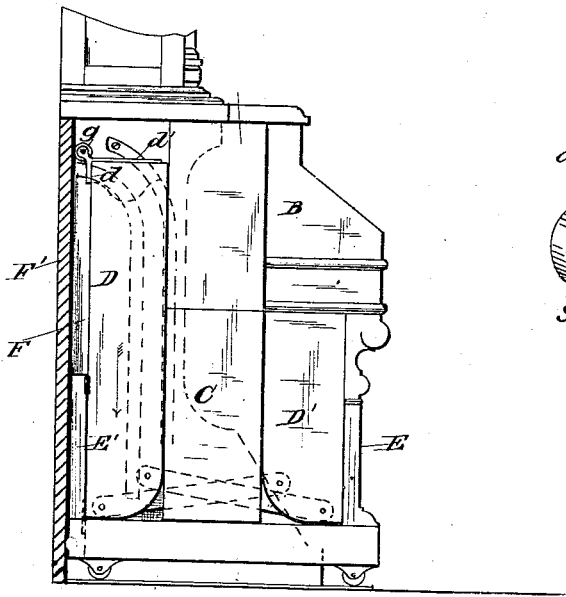
WITNESSES
W. N. N. Knight
J. O. C. Jacobson
INVENTORS
John W. Stanton
John Shibley
by Abraham & Mayer Attorneys
N. PETERS, Photo-Lithographer, Washington, D. C.

(No Model.) 3 Sheets—Sheet 2.
J. W. STANTON & J. SHIBLEY.
ATTACHMENT FOR FOLDING AND MOVABLE FURNITURE.
No. 261,059. Patented July 11, 1882.
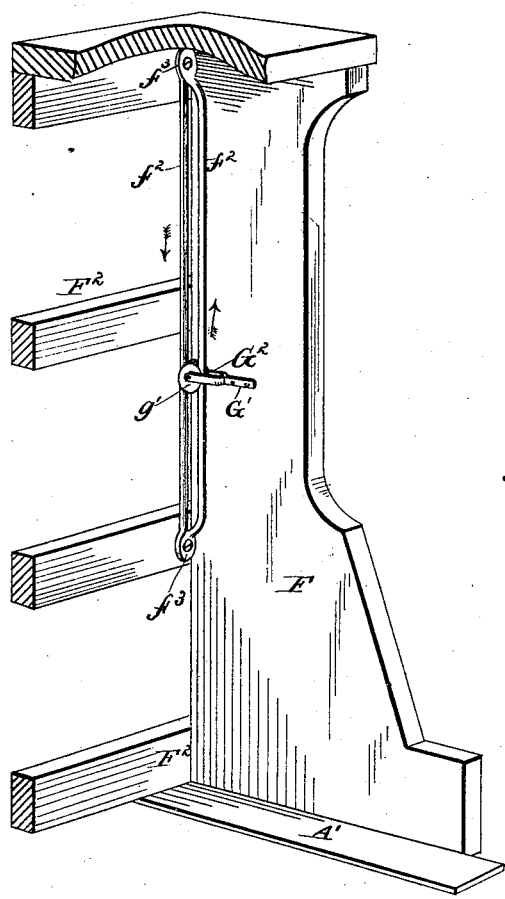
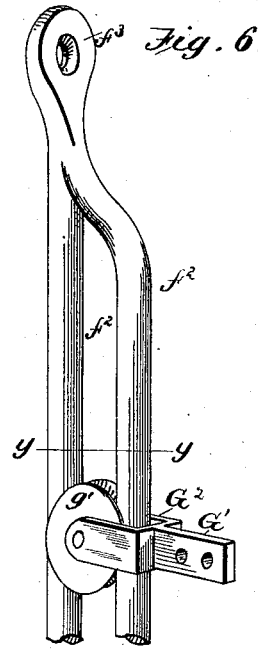
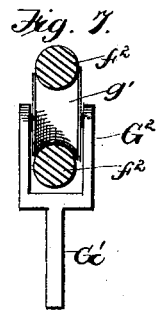
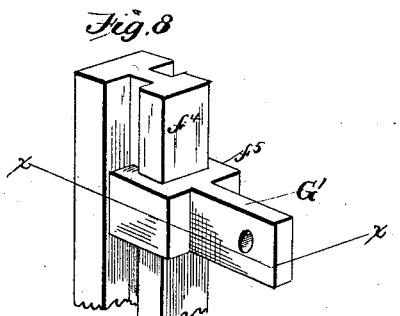
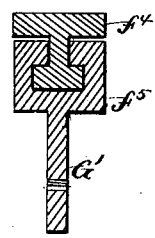
WITNESSES
INVENTORS
John W. Stanton
John Shibley
by
Abraham & Mayer Attorneys (No Model.) 3 Sheets—Sheet 3.
J. W. STANTON & J. SHIBLEY.
ATTACHMENT FOR FOLDING AND MOVABLE FURNITURE.

No. 261,059. Patented July 11, 1882.

WITNESSES
INVENTORS
John W. Stanton
John Shibley
by
Abraham Mayer Attorneys

N. PETERS, Photo-Lithographer, Washington, D. C.

UNITED STATES PATENT OFFICE.

JOHN W. STANTON AND JOHN SHIBLEY, OF NEW YORK, N. Y., ASSIGNORS TO ALFRED J. WOLF, OF NEW YORK COUNTY, N. Y.

ATTACHMENT FOR FOLDING AND MOVABLE FURNITURE.

SPECIFICATION forming part of Letters Patent No. 261,059, dated July 11, 1882.

Application filed March 27, 1882. (No model.)

*To all whom it may concern:*

Be it known that we, JOHN W. STANTON and JOHN SHIBLEY, citizens of the United States, residing at the city of New York, in the county of New York and State of New York, have invented new and useful Improvements in Attachments for Folding and Movable Furniture, of which the following is a specification.

We will confine ourselves to a description of our invention as applied to cabinet or folding bedsteads, although it is applicable to analogous articles.

The object of our invention is to retain cabinet-bedsteads while being opened near the rear or back of the case or near the wall to which they may be attached, and at the same time to permit them to be freely unfolded.

It further consists of the combination of our attachment with an under track or way attached to the inner sides of the case for the guidance of a cabinet-bedstead, to assist its movements forwardly in a right line.

Experience has demonstrated that in most of the folding bedsteads in common use it takes several movements before they are fully opened for use—as, for instance, they must first be withdrawn from their case or the wall, and then undergo the necessary manipulation for unfolding—the several movements often requiring considerable applied power, and sometimes causing the sections to sway and diverge from a direct line. This is the case with all cabinet-bedsteads that have to be withdrawn into the room before being opened. It is always difficult to determine the exact distance that such bedsteads have to be moved forwardly. The result is that when the bedstead is not drawn out sufficiently the wall and rear parts are liable to be defaced or broken, and when removed too far it requires labor and time for replacement. Unless the bedstead is drawn forward in a straight line, the lateral movement which results subjects the operative parts to undue strain. To overcome these defects is the purpose of our invention.

To the accomplishment of this end it consists in connecting the rear section of a cabinet-bedstead to its case or the wall of a room by means of rollers traveling on a grooved track or guide in an upward and downward direction.

Our improvement further consists in the employment, in combination therewith, of ground tracks or ways attached to the back or sides of the case, all as hereinafter described and claimed.

Figure 11:
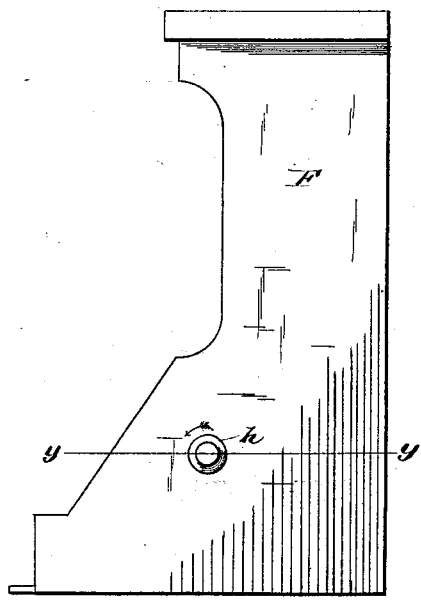
Figure 12:
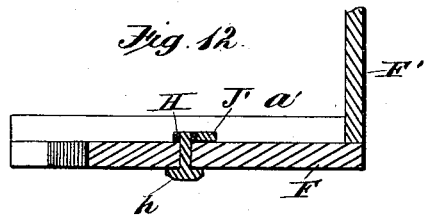

Referring to the accompanying drawings, in which similar letters of reference indicate like parts, Figure 1 is a side elevation of a cabinet or folding bedstead open, partially in section, portions being broken away to show details of construction. Fig. 2 is a side elevation thereof closed, also partially in section. Fig. 3 is a detail view of the guide-roller and its carrier. Fig. 4 is a perspective view of one of the rear side guide-tracks. Fig. 5 is a perspective view of part of the interior of a folding bedstead-case, showing our improvement as adapted to retain the bedstead toward the rear. Figs. 6 and 7 are enlarged detail views of the track and attachments shown in Fig. 5. Figs. 8 and 9 are modifications of Figs. 6 and 7. Figs. 10, 11, and 12 represent a fixed grooved track, arranged obliquely from the rear forwardly, also of the pivoted stop-block.

Our improvements are illustrated and will be described as applied to the device for which two Letters Patent were granted to John W. Stanton, one numbered 213,001, dated March 4, 1879, and the other numbered 223,770, dated January 20, 1880.

We will first describe our invention as applied to that class of cabinet-bedsteads which, in unfolding, should be removed a given distance forwardly in order to withdraw their head or rear section from under the upper projecting shelf or ornamental extension which forms a part of many popular styles, wherein a bookcase or other similar piece of furniture is comprised in the general design, and is placed above the bedstead proper, as fully illustrated in Figs. 1 and 2. In bedsteads so constructed the exact distance (which varies according to style) to which the rear section has to be drawn forwardly being first determined, we adjust a guide-track to the proper gage within the back case or upon the rear wall.

A is a movable base, provided with rollers $a$, which travel on a lower track, A', attached to the sides F. Said base carries the folding braces E E', which, when the whole device is opened, support the sectional side rails, D D', in the middle.

F in the drawings represents one side of the case, each of which sides is provided on its inner surface with a grooved track, which may be made of a single piece of wood or metal recessed out, as shown in Fig. 10, or may be composed of two guide-bars, $f\ f'$, (illustrated in Figs. 1, 2, and 4 as being perpendicular nearly their whole length, but inclined at their upper parts toward the rear,) each of which guide-bars is supplied with screw-holes or other suitable means for attaching to the sides F; but said grooved track or guides can be made entirely straight their full length and be connected to the inner surface of the side of the case in an oblique position, as shown at J J', Fig. 10.

H is a swinging stop or block, pivoted within the inner surface of the side case. It is operated by means of an exterior boss or rosette, $h$. When in the position shown in Fig. 10 it serves as a rest for the roller $g$ or pin or block that is made to run within the track. This swinging stop-block can be readily turned in the direction indicated by the dotted lines on said figure, in order to admit the unshipping of the rear section, D, from its connections with the case F.

G is a casting or corner-piece, provided with flanges $d\ d'$, which is fastened onto the rear section, D, of the side rails. It carries a pivoted guide-roller, $g$, which runs easily upon the track.

It will be observed that the front bar, $f$, and front part, J', of the oblique track are somewhat shorter at both ends than the hinder parts, for the purpose of entirely unshipping the folding sections from the sides F when required.

The operation of our improvement is manifest. The bedstead is opened and unfolded as described in the Letters Patent hereinbefore mentioned. The roller $g$ will at the same time travel down the guide-track, as indicated by arrows, Fig. 2. The section D cannot be drawn forward of the front side guides, and the roller $g$ will not pass any distance downward after the sections D D' assume the horizontal position shown in Fig. 1, and said roller finally rests on the stop-block H. In closing the bedstead said roller will travel upwardly until it arrives at the position shown in Fig. 2.

In some styles of cabinet-bedsteads—as, for instance, of the style shown in Stanton's Letters Patent No. 223,770—it is not necessary to have the rear section, D, withdrawn forwardly, and in such construction we dispense with the upper curves and the oblique or divergent form of the guide-track and make the same its full length entirely straight and perpendicular, in which case we prefer to connect said rear section to a guide composed of two rails, $f^2$, (see Figs. 5, 6, and 7,) said guide having flattened ends $f^3$, provided with screw-holes for the purpose of connecting to the inner surface of the back side of the case or to the wall of a room. Between the said rails $f^2$ we place a grooved roller, $g'$, pivoted upon a saddle, $G^2$, which bridges over the forward rail, $f^2$, and from which extends a shaft or arm, G', provided with screw-holes for the purpose of being connected to the rear section, D. It is manifest that when such a straight guide-track is employed and the bedstead is being opened the rear section will pass upward or downward, as indicated by arrows, Fig. 5, and will not be withdrawn forwardly, but will be held in near juxtaposition to the back side of the case or wall.

In Figs. 1 and 2 we show a solid back, F', which may represent a part of the case, or may be the wall of a room, of a state-room of a ship, or part of a railroad-car, to all of which purposes our invention can be applied. In Fig. 5 we show an open back consisting of cross-rails $F^2$. In either form of our improvement the lower track, A', attached to the sides of the case, serves the purpose of assisting the bedstead to open easily. The combination of the rollers $a$ and $g$ or rollers $a$ and $g'$ admits of the whole bedstead being opened and closed with a minimum of applied power and reduces friction between the several movable parts, as it will be observed that every impinging-point is dispensed with, the several rollers and tracks not only performing the function of preventing lateral displacement and confining the rear section to a given point as respects the back side and side surfaces of the case, but also serving the purpose of assisting the unfolding and closing the whole device with simplicity and ease.

As before stated, when the sides F or their back side are dispensed with, (as in the case of a state-room on a ship or railroad-car, &c.,) the guide-tracks can be adjusted to a suitable part of such vehicles or to the walls of a room.

Figs. 8 and 9 represent a modification of our invention wherein we dispense with the traveling rollers and substitute a T-track, $f^4$, bridged by a sliding mortised saddle, $f^5$, having an extending bar, G', which saddle will travel up and down said T-track, as plainly shown in perspective, Fig. 8, and in section of same figure on the line $x\ x$, Fig. 9.

Having now fully described our invention, what we claim, and desire to secure by Letters Patent, is—

1. In a cabinet-bedstead or analogous article of folding furniture, the grooved inner side and rearwardly-guiding tracks, as shown, as and for the purpose intended, substantially as described.

2. In a cabinet-bedstead or analogous article of folding furniture, a grooved rear track, in combination with a traveling roller attached to the rear section of said article of furniture, as and for the purpose intended, substantially as described.

3. In a cabinet or folding bedstead or analogous article, a rear guide-track inclined upwardly and rearwardly, within which track a guide-roller attached to the rear section of said bedstead engages and travels, adapted when said bedstead is opened or closed to admit said section to be extended a required distance forwardly, substantially as described.

4. In a cabinet or folding bedstead or analogous article, the combination of the sectional side rail, D, with the casting G, having side and lower flanges, $d\ d'$, and pivoted roller $g$, substantially as described.

5. In a cabinet-bedstead or analogous article, a rear track inclined from front to rear, attached to each inner side surface of the case, and provided with a lower swinging stop-block adapted to support the roller or pin traveling within said track, substantially as described.

6. The combination, in a cabinet or folding bedstead, of the sectional front side rail, D', and rear sectional side rail, D, said rear side rail being provided with a corner-piece, G, supplied with a pivoted roller, $g$, the peripheral surface of said roller $g$ being adjusted within a rear grooved track, with said rear grooved track, and, further, in combination with a lower track, A', and intermediate parts and rollers $a$ upon the base-piece A, as and for the purpose set forth, substantially as described.

JOHN W. STANTON.
JOHN SHIBLEY.

Witnesses:
B. J. CUMMINS,
JOHN V. LUFF.